United States Patent
Credali et al.

(10) Patent No.: US 7,125,924 B2
(45) Date of Patent: Oct. 24, 2006

(54) HIGHLY FILLED SOFT POLYOLEFIN COMPOSITIONS

(75) Inventors: Umberto Credali, Ferrara (IT); Ugo Zucchelli, Ferrara (IT); Paolo Goberti, Ferrara (IT)

(73) Assignee: Basell Poliolefine Italia S.p.A., Milan (IT)

( * ) Notice: Subject to any disclaimer, the term of this patent is extended or adjusted under 35 U.S.C. 154(b) by 0 days.

(21) Appl. No.: 10/495,299

(22) PCT Filed: Aug. 28, 2003

(86) PCT No.: PCT/EP03/09582

§ 371 (c)(1),
(2), (4) Date: May 11, 2005

(87) PCT Pub. No.: WO2004/026957

PCT Pub. Date: Apr. 1, 2004

(65) Prior Publication Data

US 2005/0222314 A1 Oct. 6, 2005

Related U.S. Application Data

(60) Provisional application No. 60/413,689, filed on Sep. 26, 2002.

(30) Foreign Application Priority Data

Sep. 17, 2002 (EP) .................................. 02078918

(51) Int. Cl.
*C08K 5/34* (2006.01)
*C08K 3/26* (2006.01)
*C08K 9/34* (2006.01)

(52) U.S. Cl. ...................... 524/425; 524/445; 524/446; 502/230; 525/240; 525/242

(58) Field of Classification Search ................ 524/502, 524/515, 425, 445, 446; 525/240
See application file for complete search history.

(56) References Cited

U.S. PATENT DOCUMENTS

| | | | |
|---|---|---|---|
| 4,317,765 A | 3/1982 | Gaylord | 523/204 |
| 4,399,054 A | 8/1983 | Ferraris et al. | 252/429 B |
| 4,472,524 A | 9/1984 | Albizzati | 502/113 |
| 4,622,352 A * | 11/1986 | Djiauw et al. | 523/200 |
| 5,145,819 A | 9/1992 | Winter et al. | 502/117 |
| 5,182,248 A * | 1/1993 | Cody et al. | 502/230 |
| 5,218,046 A | 6/1993 | Audureau et al. | 525/194 |
| 5,229,463 A * | 7/1993 | Yano et al. | 525/240 |
| 5,324,800 A | 6/1994 | Welborn, Jr. et al. | 526/160 |
| 5,334,663 A | 8/1994 | Audureau et al. | 525/194 |

FOREIGN PATENT DOCUMENTS

| | | |
|---|---|---|
| EP | 0045977 | 2/1982 |
| EP | 0129368 | 12/1984 |
| EP | 0361493 | 4/1990 |
| EP | 0416815 | 3/1991 |
| EP | 0420436 | 4/1991 |
| EP | 0472946 | 3/1992 |
| EP | 0485823 | 5/1992 |
| EP | 0530940 | 3/1993 |
| EP | 0643066 | 3/1995 |
| EP | 0671404 | 9/1995 |
| EP | 0728769 | 8/1996 |
| EP | 1043733 | 10/2000 |
| EP | WO-0148075 A1 * | 7/2001 |
| EP | WO-0222732 A1 * | 3/2002 |
| EP | 1279699 | 1/2003 |
| IT | WO 00/11057 * | 3/2000 |
| IT | WO 01/48-75 * | 7/2001 |
| WO | 9104257 | 4/1991 |
| WO | 0011057 | 3/2000 |
| WO | 0148075 | 7/2001 |
| WO | 03011962 | 2/2003 |

* cited by examiner

*Primary Examiner*—David W. Wu
*Assistant Examiner*—Ives Wu
(74) *Attorney, Agent, or Firm*—William R Reid

(57) ABSTRACT

Polyolefin compositions filled with high amounts of inorganic fillers comprising, by weight: (I) 20 to 60% by weight of an heterophasic polyolefin composition comprising: A) from 8 to 25% by weight of a crystalline polymer fraction selected from propylene homopolymer, propylene copolymers and mixture there; and B) from 75 to 92% by weight of an elastomeric fraction comprising at least an elastomeric copolymer of propylene or ethylene with 15 to 45% of at least one alpha-olefin, having solubility in xylene at room temperature greater than 50% by weight, the intrinsic viscosity of the xylene soluble fraction ranging from 3.0 to 6.5 dl/g; and (II) 40 to 80% by weight of an inorganic filler selected from flame-retardant inorganic fillers and inorganic oxides or salts.

11 Claims, 1 Drawing Sheet

HIGHLY FILLED SOFT POLYOLEFIN COMPOSITIONS

This application is the U.S. national phase of International Application PCT/EP2003/009582, filed Aug. 28, 2003.

The present invention concerns soft polyolefin compositions comprising a high amount of inorganic fillers.

BACKGROUND OF THE INVENTION

Polyolefin compositions having elastic properties while maintaining a good thermoplastic behavior have been used in many application fields, due to the valued properties which are typical of polyolefins, such as chemical inertia, mechanical properties and nontoxicity. Moreover, they can be advantageously transformed into finished products with the same techniques used for thermoplastic polymers.

In particular, flexible polymer materials are widely used in the medical field, as well as for packaging, extrusion coating and electrical wires and cables covering.

In many of these applications, vinyl chloride polymers containing adequate plasticizers, which are necessary to give said polymers their desired flexibility characteristics, are presently used. Said polymer products, however, are subject to ever increasing criticism both for the suspected toxicity of the plasticizers they contain and because when incinerated, they can disperse into the atmosphere extremely toxic by-products, such as dioxin. It would be very useful, therefore, to substitute said materials with products which besides the desired flexibility characteristics and transparency, would have the chemical inertia and nontoxicity typical of olefin polymers.

Elastic polypropylene compositions retaining good thermoplastic behavior has been obtained in the art by way of sequential copolymerization of propylene, optionally containing minor quantities of olefin comonomers, and then ethylene/propylene or ethylene/alpha-olefin mixtures. Catalysts based on halogenated titanium compounds supported on magnesium chloride are commonly used for this purpose.

For instance, EP-A-472 946 describes flexible elastoplastic polyolefin compositions comprising, in parts by weight:
A) 10–50 parts of an isotactic propylene homopolymer or copolymer;
B) 5–20 parts of an ethylene copolymer, insoluble in xylene at room temperature; and
C) 40–80 parts of an ethylene/propylene copolymer containing less than 40% by weight of ethylene and being soluble in xylene at room temperature; the intrinsic viscosity of said copolymer is preferably from 1.7 to 3 dl/g.

Said compositions are relatively flexible and have good elastic properties, as demonstrated by flexural modulus lower than 150 MPa values, Shore D hardness from 20 and 35, and Shore A hardness of about 90, associated to good tension set values (of 20–50% at 75% elongation, and about 33–40% at 100% elongation); nevertheless, such values are not fully satisfactory for many applications.

Mineral fillers, such as aluminum and magnesium hydroxides or calcium carbonate, are commonly used at high concentration levels in polyolefin compositions for several reasons, for instance to impart self-extinguishing properties or to improve application-related physical properties, such as soft touch and printability.

The major disadvantage of these mineral fillers, in particular when used on functional grounds as in the case of flame retardants, is the very high loading needed. Depending on the class of fire-retardancy requested, up to 65–70% by weight of filler can be necessary in order to reach adequate effectiveness in polyolefins. Normally, this has a highly negative influence on the processing of the polymer, with difficulties in adding and dispersing such high levels of filler, and on the physical-mechanical properties of compounds, namely lower elongation at break, lower tensile strength and higher brittleness.

EP 1 043 733 describes self-extinguishing electrical cables having a coating layer based on a polymer material containing a flame-retardant inorganic filler; this polymer material comprises a heterophase copolymer having at least 45% by weight of an elastomeric phase based on ethylene copolymerized with an alpha-olefin, and a thermoplastic phase based on propylene. While these compositions incorporate large amounts of flame-retardant filler, the very high levels of filler negatively affect the physical-mechanical properties of the polymer material, and in particular lead to low elongation values. As a result, the final product is no longer apt to various applications, such as roofing, membranes and cables. In order to compete with plasticised PVC in the above applications, it would be necessary to provide flexible polyolefin compositions, having low flexural modulus and hardness values, capable of incorporating large amounts of filler without deterioration of physical and mechanical properties, and in particular elongation at break, stress at break and tension set.

More flexible elastoplastic polyolefin compositions have been described in the International Application WO03/011962, and comprise, by weight:
A) 8 to 25% of a crystalline polymer fraction selected from propylene homopolymer and propylene copolymers with a $C_{4-8}$ alpha-olefin;
B) 75 to 92% an elastomeric fraction comprising two different propylene elastomeric copolymers, and more specifically: (1) a first elastomeric copolymer of propylene with 15 to 32% of a $C_{4-8}$ alpha-olefin, and (2) a second elastomeric copolymer of propylene with more than 32% up to 45% of a $C_{4-8}$ alpha-olefin, the (1)/(2) weight ratio ranging from 1:5 to 5:1.

These polyolefin compositions have flexural modulus lower than 60 MPa, Shore A hardness lower than 90, and tension set at 100% lower than 35%. The compositions described in this document do not contain relevant amounts of fillers.

SUMMARY OF THE INVENTION

The Applicant has unexpectedly found that specific flexible polyolefin compositions can be filled with high amounts of inorganic fillers without loosing their physical-mechanical properties, and in particular retaining low hardness and flexural modulus values, high elongation at break and low tension set values. Therefore, an object of the present invention is a highly filled soft polyolefin composition comprising:
(I) 20 to 60% by weight of an heterophasic polyolefin composition comprising the following fractions:
A) from 8 to 25% by weight of a crystalline polymer fraction selected from:
  (i) a propylene homopolymer, having solubility in xylene at room temperature lower than 10% by weight;
  (ii) a copolymer of propylene and at least one alpha-olefin of formula $H_2C=CHR$, where R is H or a $C_{2-10}$ linear or branched alkyl, containing at least 85% by weight of propylene, having solubility in xylene at room temperature lower than 15% by weight;
  (iii) a mixture of (i) and (ii);

B) from 75 to 92% by weight of an elastomeric fraction comprising at least an elastomeric copolymer of propylene or ethylene with 15 to 45% by weight of at least one alpha-olefin of formula $H_2C=CHR$, where R is H or a $C_{2-10}$ linear or branched alkyl, optionally containing 0.5 to 5% by weight of a diene, and having solubility in xylene at room temperature greater than 50% by weight, the intrinsic viscosity of the xylene soluble fraction ranging from 3.0 to 6.5 dl/g; and (II) 40 to 80% by weight of an inorganic filler selected from flame-retardant inorganic fillers and inorganic oxides or salts.

The highly filled soft polyolefin composition of the invention has preferably Shore A hardness lower than 90, elongation at break (ASTM D638) higher than 400%, tensile strength at break (ASTM D638) equal to or higher than 4 MPa and tension set at 100% lower than 35%.

DETAILED DESCRIPTION OF THE INVENTION

Figure 1:
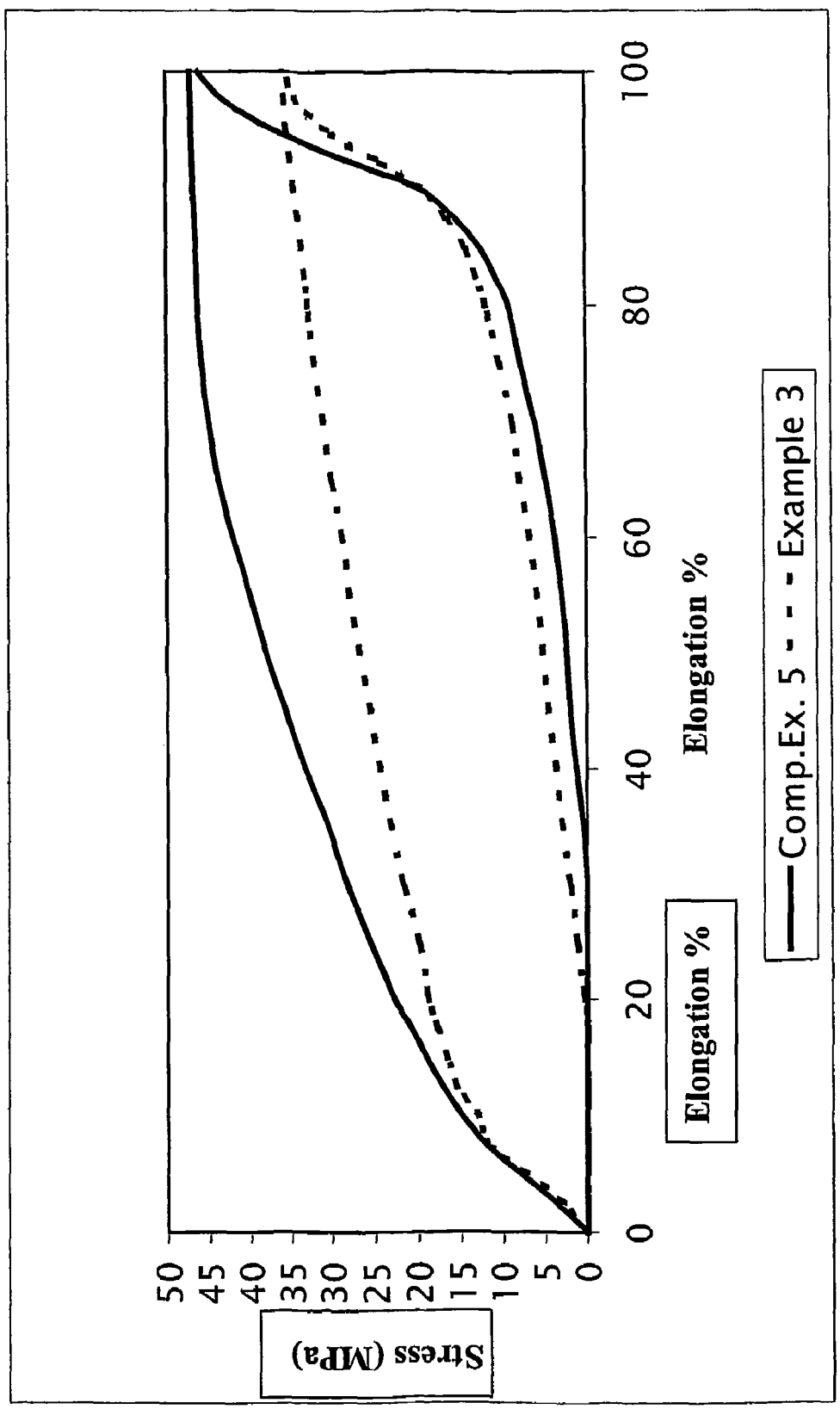
FIG. 1 illustrates hysterisis curves of Example 3 and Comparative Example 5.

The highly filled polyolefin compositions of the invention are able to incorporate and retain high amount of inorganic filler contained in the heterophasic polyolefin composition, maintaining very low flexural modulus values and flexible behavior and, at the same time exerting the property imparted by the filler, such as self-extinguishing properties in case of flame-retardant fillers, which is essential for most cable applications, roofing applications and soft sheeting.

Moreover, the compositions of the invention, at of tensile strength, show elongation at break values higher than the ones shown by the filled compositions known in the prior art. Finally, the compositions of the invention are endowed with good elastic properties, especially when stretched.

The highly filled soft polyolefin compositions of the present invention comprise from 20 to 60% by weight, preferably from 30 to 50%, and even more preferably from 30 to 35% of an heterophasic polyolefin composition (I), comprising the following fractions:

A) from 8 to 25% by weight, preferably from 10 to 20%, and even more preferably from 12 to 18% of a crystalline polymer fraction selected from:
  (i) a propylene homopolymer, having solubility in xylene at room temperature lower than 10% by weight;
  (ii) a copolymer of propylene and at least one alpha-olefin of formula $H_2C=CHR$, where R is H or a $C_{2-10}$ linear or branched alkyl, containing at least 85% by weight of propylene, having solubility in xylene at room temperature lower than 15% by weight;
  (iii) a mixture of (i) and (ii);
B) from 75 to 92% by weight, preferably from 80 to 90%, and even more preferably from 82 to 88% of an elastomeric fraction comprising at least an elastomeric copolymer of propylene or ethylene with 15 to 45% by weight of at least one alpha-olefin of formula $H_2C=CHR$, where R is H or a $C_{2-10}$ linear or branched alkyl, optionally containing 0.5 to 5% by weight of a diene, and having solubility in xylene at room temperature greater than 50% by weight, the intrinsic viscosity of the xylene soluble fraction ranging from 3.0 to 6.5 dl/g.

In the crystalline polymer fraction (A), the homopolymer (i) has solubility in xylene at room temperature preferably lower than 5% by weight, and even more preferably lower than 3%.

By "room temperature" is meant herein a temperature of about 23° C.

The copolymer of propylene (ii) contains preferably at least 90% by weight propylene, and has solubility in xylene at room temperature preferably lower than 10% by weight, and even more preferably lower than 8%. Said alpha-olefin is preferably ethylene, butene-1, pentene-1, 4-methylpentene, hexene-1, octene-1 or combinations thereof, and even more preferably the copolymer of propylene (ii) is a copolymer of propylene and ethylene. The elastomeric fraction (B) of heterophasic polyolefin composition (I) preferably contains from 20 to 40% by weight alpha-olefin, and has solubility in xylene at room temperature greater than 80% by weight, the intrinsic viscosity of the xylene soluble fraction ranging from 4.0 to 5.5 dl/g By "elastomeric" is meant herein a polymer having low crystallinity or amorphous, having a solubility in xylene at room temperature greater than 50% by weight.

According to a preferred embodiment of the compositions of the present invention, the elastomeric fraction (B) of the polyolefin compositions of the invention comprises a first elastomeric copolymer (1) and a second elastomeric copolymer (2).

More preferably, said elastomeric fraction comprises:
(1) a first elastomeric copolymer of propylene with at least one alpha-olefin of formula $H_2C=CHR$, where R is H or a $C_{2-10}$ linear or branched alkyl, optionally containing 0.5 to 5% by weight of a diene, said first elastomeric copolymer containing from 15 to 32% by weight alpha-olefin, preferably from 20 to 30, and having solubility in xylene at room temperature greater than 50% by weight, the intrinsic viscosity of the xylene soluble fraction ranging from 3.0 to 5.0 dl/g; and (2) a second elastomeric copolymer of propylene with at least one alpha-olefin of formula $H_2C=CHR$, where R is H or a $C_{2-10}$ linear or branched alkyl, optionally containing 0.5 to 5% by weight of a diene, said second elastomeric copolymer containing more than 32% up to 45% by weight alpha-olefin, preferably from 35 to 40%, and having solubility in xylene at room temperature greater than 80% by weight, the intrinsic viscosity of the xylene soluble fraction ranging from 4.0 to 6.5 dl/g;

the (1)/(2) weight ratio ranging from 1:5 to 5:1, preferably from 1:2 to 4:1, and more preferably from 1:1 to 2:1.

The first elastomeric copolymer (1) is preferably a copolymer of propylene with at least one alpha-olefin selected from ethylene, butene-1, hexene-1 and octene-1; even more preferably said alpha-olefin is ethylene. The first elastomeric copolymer (1) has a solubility in xylene at room temperature greater than 50% by weight, preferably greater than 70%, and even more preferably greater than 80%; the intrinsic viscosity of the xylene soluble fraction ranges from 3.0 to 5.0 dl/g, more preferably from 3.5 to 4.5 dl/g, and even more preferably from 3.8 to 4.3 dl/g.

The second elastomeric copolymer (2) is preferably a copolymer of propylene with at least one alpha-olefin selected from ethylene, butene-1, hexene-1 and octene-1; even more preferably, said alpha-olefin is ethylene. The second elastomeric copolymer (2) has solubility in xylene at room temperature greater than 80% by weight, preferably greater than 85%, and the intrinsic viscosity of the xylene soluble fraction ranges from 4.0 to 6.5 dl/g, preferably from 4.5 to 6.0, and more preferably from 5.0 to 5.7 dl/g.

The copolymerization of propylene and ethylene or another alpha-olefin or combinations thereof, to form the copolymers (1) and (2) of the elastomeric fraction (B) can occur in the presence of a diene, conjugated or not, such as butadiene, 1,4-hexadiene, 1,5-hexadiene and ethylidenenorbornene-1. The diene, when present, is contained in an amount of from 0.5 to 5% by weight, with respect to the weight of the fraction (B).

The heterophasic polyolefin composition (I) can present crystallinity deriving from poly-alpha-olefin sequences, and preferably from polyethylene sequences, due to the partial formation of such sequences in the polymerization of the elastomeric copolymers (B)(1) and (2). This crystallinity may be detected by measuring the heat of fusion deriving from poly-alpha-olefin sequences (e.g. PE enthalpy) by means of Differential Scanning Calorimetry (DSC) analysis; in DSC, the composition may present at least a melting peak attributable to a crystalline PE phase, i.e. to $(CH_2)_n$ sequences of the crystalline type. In the compositions of the invention, the heat of fusion of peaks present below 130° C. and attributable to polyethylene sequences is preferably greater than 3 J/g.

According to a preferred embodiment of the invention, the heterophasic polyolefin composition (I) is in the form of spherical particles having an average diameter of 250 to 7,000 microns, a flowability of less than 30 seconds and a bulk density (compacted) greater than 0.4 g/ml.

The heterophasic polyolefin composition (I) may be prepared by sequential polymerization in at least two sequential polymerization stages, with each subsequent polymerization being conducted in the presence of the polymeric material formed in the immediately preceding polymerization reaction. The polymerization stages may be carried out in the presence of a Ziegler-Natta and/or a metallocene catalyst.

According to a preferred embodiment, all the polymerization stages are carried out in the presence of a catalyst comprising a trialkylaluminum compound, optionally an electron donor, and a solid catalyst component comprising a halide or halogen-alcoholate of Ti and an electron donor compound supported on anhydrous magnesium chloride, said solid catalyst component having a surface area (measured by BET) of less than 200 m²/g, and a porosity (measured by BET) higher than 0.2 ml/g.

Catalysts having the above mentioned characteristics are well known in the patent literature; particularly advantageous are the catalysts described in U.S. Pat. No. 4,399,054 and EP-A-45 977. Other examples can be found in U.S. Pat. No. 4,472,524.

The polymerization process is described in details in the International Application WO03/011962, the content of which is incorporated herein by reference.

The solid catalyst components used in said catalysts comprise, as electron-donors (internal donors), compounds selected from the group consisting of ethers, ketones, lactones, compounds containing N, P and/or S atoms, and esters of mono- and dicarboxylic acids. Particularly suitable electron-donor compounds are phthalic acid esters, such as diisobutyl, dioctyl, diphenyl and benzylbutyl phthalate.

Other electron-donors particularly suitable are 1,3-diethers of formula:

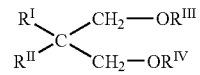

wherein $R^I$ and $R^{II}$, the same or different from each other, are $C_1$–$C_{18}$ alkyl, $C_3$–$C_{18}$ cycloalkyl or $C_7$–$C_{18}$ aryl radicals; $R^{III}$ and $R^{IV}$, the same or different from each other, are $C_1$–$C_4$ alkyl radicals; or are the 1,3-diethers in which the carbon atom in position 2 belongs to a cyclic or polycyclic structure made up of 5, 6 or 7 carbon atoms and containing two or three unsaturations.

Ethers of this type are described in EP-A-361 493 and EP-A-728 769.

Representative examples of said diethers are 2-methyl-2-isopropyl-1,3-dimethoxypropane, 2,2-diisobutyl-1,3-dimethoxypropane, 2-isopropyl-2-cyclopentyl-1,3-dimethoxypropane, 2-isopropyl-2-isoamyl-1,3-dimethoxypropane, and 9,9-bis(methoxymethyl)fluorene.

The preparation of the above mentioned catalyst components is carried out according to known methods.

For example, a $MgCl_2 \cdot nROH$ adduct (in particular in the form of spheroidal particles) wherein n generally ranges from 1 to 3 and ROH is ethanol, butanol or isobutanol, is reacted with an excess of $TiCl_4$ containing the electron-donor compound. The reaction temperature is generally comprised between 80 and 120° C. The solid is then isolated and reacted once more with $TiCl_4$, in the presence or absence of the electron-donor compound; it is then separated and washed with a hydrocarbon until all chlorine ions have disappeared.

In the solid catalyst component the titanium compound, expressed as Ti, is generally present in an amount from 0.5 to 10% by weight. The quantity of electron-donor compound which remains fixed on the solid catalyst component generally is 5 to 20% by moles with respect to the magnesium dihalide.

The titanium compounds which can be used in the preparation of the solid catalyst component are the halides and the halogen alcoholates of titanium. Titanium tetrachloride is the preferred compound.

The reactions described above result in the formation of a magnesium halide in active form. Other reactions are known in the literature, which cause the formation of magnesium halide in active form starting from magnesium compounds other than halides, such as magnesium carboxylates.

The Al-alkyl compounds used as co-catalysts comprise Al-trialkyls, such as Al-triethyl, Al-triisobutyl, Al-tri-n-butyl, and linear or cyclic Al-alkyl compounds containing two or more Al atoms bonded to each other by way of O or N atoms, or $SO_4$ or $SO_3$ groups. The Al-alkyl compound is generally used in such a quantity that the Al/Ti ratio is from 1 to 1000. Electron-donor compounds that can be used as external donors include aromatic acid esters such as alkyl benzoates, and in particular silicon compounds containing at least one Si—OR bond, where R is a hydrocarbon radical.

Examples of silicon compounds are $(tert\text{-butyl})_2Si(OCH_3)_2$, $(cyclohexyl)(methyl)Si(OCH_3)_2$, $(phenyl)_2Si(OCH_3)_2$ and $(cyclopentyl)_2Si(OCH_3)_2$. 1,3-diethers having the formulae described above can also be used advantageously. If the internal donor is one of these dieters, the external donors can be omitted.

The solid catalyst component have preferably a surface area (measured by BET) of less than 200 m²/g, and more preferably ranging from 80 to 170 m²/g, and a porosity (measured by BET) preferably greater than 0.2 ml/g, and more preferably from 0.25 to 0.5 ml/g.

The catalysts may be precontacted with small quantities of olefin (prepolymerization), maintaining the catalyst in suspension in a hydrocarbon solvent, and polymerizing at temperatures from room temperature to 60° C., thus producing a quantity of polymer from 0.5 to 3 times the weight of the catalyst. The operation can also take place in liquid monomer, producing, in this case, a quantity of polymer 1000 times the weight of the catalyst.

By using the above mentioned catalysts, the polyolefin compositions are obtained in spheroidal particle form, the particles having an average diameter from about 250 to 7,000 microns, a flowability of less than 30 seconds and a bulk density (compacted) greater than 0.4 g/ml.

Other catalysts that may be used to prepare the heterophasic polyolefin composition (I) are metallocene-type catalysts, as described in U.S. Pat. No. 5,324,800 and EP-A-0 129 368; particularly advantageous are bridged bis-indenyl metallocenes, for instance as described in U.S. Pat. No. 5,145,819 and EP-A-0 485 823. Another class of suitable catalysts are the so-called constrained geometry catalysts, as described in EP-A-0 416 815, EP-A-0 420 436, EP-A-0 671 404, EP-A-0 643 066 and WO 91/04257. These metallocene compounds may be advantageously used to produce the elastomeric copolymers (B)(1) and (B)(2).

According to a preferred embodiment, the polymerization process of the invention comprises three stages, all carried out in the presence of Ziegler-Natta catalysts, where: in the first stage the relevant monomer(s) are polymerized to form the fraction (A); in the second stage a mixture of propylene and an alpha-olefin and optionally a diene are polymerized to form the elastomeric copolymer (B) (1); and in the third stage a mixture of ethylene or propylene and an alpha-olefin and optionally a diene are polymerized to form the elastomeric copolymer (B) (2).

The polymerization stages may occur in liquid phase, in gas phase or liquid-gas phase. Preferably, the polymerization of the crystalline polymer fraction (A) is carried out in liquid monomer (e.g. using liquid propylene as diluent), while the copolymerization stages of the elastomeric copolymers (B)(1) and (B)(2) are carried out in gas phase, without intermediate stages except for the partial degassing of the propylene. According to a most preferred embodiment, all the three sequential polymerization stages are carried out in gas phase.

The reaction temperature in the polymerization stage for the preparation of the crystalline polymer fraction (A) and in the preparation of the elastomeric copolymers (B)(1) and (B)(2) can be the same or different, and is preferably from 40° C. to 90° C.; more preferably, the reaction temperature ranges from 50 to 80° C. in the preparation of the fraction (A), and from 40 to 80° C. for the preparation of components (B)(1) and (B)(2).

The pressure of the polymerization stage to prepare the fraction (A), if carried out in liquid monomer, is the one which competes with the vapor pressure of the liquid propylene at the operating temperature used, and it may be modified by the vapor pressure of the small quantity of inert diluent used to feed the catalyst mixture, by the overpressure of optional monomers and by the hydrogen used as molecular weight regulator.

The polymerization pressure preferably ranges from 33 to 43 bar, if done in liquid phase, and from 5 to 30 bar if done in gas phase. The residence times relative to the two stages depend on the desired ratio between the fractions (A) and (B), and can usually range from 15 minutes to 8 hours. Conventional molecular weight regulators known in the art, such as chain transfer agents (e.g. hydrogen or $ZnEt_2$), may be used.

The highly filled polyolefin compositions of the present invention comprise from 40 to 80% by weight, preferably from 50 to 70%, and even more preferably from 65 to 70% of an inorganic filler (II) selected from flame-retardant inorganic fillers and inorganic oxides or salts.

In applications where self-extinguishing properties are required, preferred flame-retardant inorganic fillers are hydroxides, hydrated oxides, salts or hydrated salts of metals, in particular of Ca, Al or Mg, such as, for example: magnesium hydroxide $Mg(OH)_2$, aluminum hydroxide $Al(OH)_3$, alumina trihydrate $Al_2O_3.3H_2O$, magnesium carbonate hydrate, magnesium carbonate $MgCO_3$, magnesium calcium carbonate hydrate, magnesium calcium carbonate, or mixtures thereof. $Mg(OH)_2$, $Al(OH)_3$, $Al_2O_3.3H_2O$ and mixtures thereof are particularly preferred.

The metal hydroxides, in particular the magnesium and aluminium hydroxides, are preferably used in the form of particles with sizes which can range between 0.1 and 100 µm, preferably between 0.5 and 10 µm.

One inorganic filler which is particularly preferred according to the present invention is natural magnesium hydroxide, which is obtained by milling minerals based on magnesium hydroxide, such as brucite and the like. Brucite is found in nature as such or, more frequently, in combination with other minerals, such as calcite, aragonite, talc or magnesite. The brucite can be milled, according to known techniques, under wet or dry conditions, preferably in the presence of milling coadjutants, such as polyglycols or the like. The specific surface area of the milled product generally ranges from 5 to 20 m/g, preferably from 6 to 15 m/g. The magnesium hydroxide thus obtained can be subsequently classified, for example by sieving, in order to obtain an average particle diameter ranging from 1 to 15 µm, preferably from 1.5 to 5 µm, and a particle size distribution such that the particles with a diameter of less than 1.5 µm form no more than 10% of the total, and the particles with a diameter of greater than 20 µm form no more than 10% of the total.

Natural magnesium hydroxide generally contains various impurities deriving from salts, oxides and/or hydroxides of other metals, such as Fe, Mn, Ca, Si, V, etc. The amount and nature of such impurities depend on the origin of the starting material. The degree of purity is generally between 80 and 98% by weight.

The filler can be advantageously used in the form of coated particles. Coating materials preferably used are saturated or unsaturated fatty acids containing from 8 to 24 carbon atoms, and metal salts thereof, such as, oleic acid, palmitic acid, stearic acid, isostearic acid, lauric acid, and magnesium or zinc stearate or oleate.

Inorganic oxides or salts are preferably selected from CaO, $TiO_2$, $Sb_2O_3$, ZnO, $Fe_2O_3$, $CaCO_3$, $BaSO_4$ and mixtures thereof.

The highly filled soft polyolefin compositions according to the present invention can be prepared by mixing the polymer component, the filler and optionally further additives according to methods known in the state of the art. For instance, the components may be mixed in an internal mixer having tangential rotors (such as Banbury mixers) or having interpenetrating rotors, or alternatively in continuous mixers (such as Buss mixers) or co-rotating or counter-rotating twin-screw mixers.

The highly filled soft polyolefin compositions of the invention, having very low flexural modulus values, are capable of incorporating large amounts of fillers, at the same time retaining the physical and mechanical properties of unfilled and less flexible compositions. More specifically, the polyolefin compositions of the invention are preferably endowed with hardness Shore A lower than 90, more preferably lower than 85; elongation at break (ASTM D638) higher than 400%, more preferably higher than 450%; tensile strength at break (ASTM D638) equal to or higher than 4 MPa, more preferably higher than 5 MPa; and tension set at 100% lower than 35%, more preferably lower than 30%.

Moreover, the polyolefin compositions of the invention preferably have flexural modulus lower than 60 MPa, more preferably from 10 to 50 MPa.

A further characteristic of the highly filled polyolefin compositions of the instant invention is that they are capable of retaining very good elastic properties, especially when stretched; in particular, after a stretching of 3:1 (i.e. 200%), they show tension set values at 100% preferably lower than 20%, and more preferably lower than 15%.

The polyolefin compositions of the present invention find application as plasticized PVC replacement.

In fields where self-extinguishing properties are required, the compositions of the invention may be used in lieu of plasticized PVC, in applications such as reinforced and non-reinforced roofing membranes, inner filling for industrial cables, cable sheathing and adhesive tapes.

Where flame-retardancy is not requested, the compositions of the invention may be advantageously used in non flame-retardant soft membranes, coupled or non-coupled with a reinforcement (e.g. in publicity banners, liners, tarpaulin, sport-wear and safety clothing), and as synthetic leather. Moreover, the compositions may be used in packaging and extrusion coating.

Therefore, the present invention is further directed to an article comprising the above-described polyolefin composition.

Conventional additives commonly used in the state of the art may be added to the highly filled soft polyolefin compositions of the present invention.

For instance, in order to enhance the compatibility between the inorganic filler and the heterophasic polymer composition, coupling agents may be used; said coupling agents may be saturated silane compounds or silane compounds containing at least one ethylenic unsaturation, epoxides containing an ethylenic unsaturation, organic titanates, mono- or dicarboxylic acids containing at least one ethylenic unsaturation, or derivatives thereof such as anhydrides or esters.

Mono- or dicarboxylic acids containing at least one ethylenic unsaturation, or derivatives thereof, which can be used as coupling agents are, for example, maleic acid, maleic anhydride, fumaric acid, citraconic acid, itaconic acid, acrylic acid, methacrylic acid and the like, and the anhydrides or esters derived therefrom, or mixtures thereof. Maleic anhydride is particularly preferred.

The coupling agents can be used as such or pregrafted onto a polyolefin, for example polyethylene or copolymers of ethylene with an alpha-olefin, by means of a radical reaction (as described for instance in EP-A-530 940). The amount of grafted coupling agent is generally comprised between 0.05 and 5 parts by weight, preferably from 0.1 to 2 parts by weight, relative to 100 parts by weight of polyolefin. Polyolefins grafted with maleic anhydride are commonly available as commercial products, such as Qestron by Basell.

Alternatively, the coupling agents of carboxylic or epoxy type mentioned above (for example maleic anhydride) or silanes containing an ethylenic unsaturation (for example vinyltrimethoxysilane) can be added to the mixture in combination with a radical initiator so as to graft the compatibilizing agent directly onto the polymer material. Initiators which can be used are organic peroxides, such as tert-butyl perbenzoate, dicumyl peroxide, benzoyl peroxide, di-tert-butyl peroxide and the like. This technique is described, for example, in U.S. Pat. No. 4,317,765.

The amount of coupling agent to be added to the mixture may vary according to the nature of the coupling agent used and the amount of flame-retardant filler added, and preferably ranges from 0.01 to 10%, more preferably from 0.1 to 5%, and even more preferably from 1 to 3% by weight with respect to the total weight of the highly filled polyolefin composition. Depending on the properties needed for the different applications, the compositions of the invention may be used in combination with other elastomeric polymers such as ethylene/propylene copolymers (EPR), ethylene/propylene/diene terpolymers (EPDM), copolymers of ethylene with $C_4$–$C_{12}$ alpha-olefins (e.g. ethylene/octene-1 copolymers, such as the ones commercialized under the name Engage®) and mixtures thereof. Such elastomeric polymers may be present in an amount of 5 to 80% wt. of the total composition. Conventional additives such as processing aids, lubricants, nucleating agents, extension oils, organic and inorganic pigments, anti-oxidants and UV-protectors, commonly used in olefin polymers, may be added.

Processing aids usually added to the polymer material are, for example, calcium stearate, zinc stearate, stearic acid, paraffin wax, synthetic oil and silicone rubbers.

Examples of suitable antioxidants are polymerized trimethyldihydroquinoline, 4,4'-thiobis(3-methyl-6-tert-butyl) phenol; pentaerythrityltetrakis[3-(3,5-di-tert-butyl-4-hydroxy phenyl)propionate] and 2,2'-thiodiethylenebis[3-(3,5-di-tertbutyl-4-hydroxyphenyl) propionate].

Other fillers which can be used are, for example, glass particles, glass fibers, calcinated kaolin and talc.

The following analytical methods have been used to determine the properties reported in the present application.

| Property | Method |
| --- | --- |
| Comonomer content (% wt) | I.R. Spectroscopy |
| Intrinsic Viscosity | Determined in tetrahydronaphthalene at 135° C. |
| Melt Flow Rate (230° C., 2.16 kg) | ASTM D 1238, condition L |
| Melt Flow Rate (230° C., 21.6 kg) | ASTM D 1238 |
| Hardness Shore A | ASTM D 2240 |
| Tension set at 100% | ASTM D412, on bands extruded on a 19 mm, 21 L/D" Plasticiser extruder, with temperature controlled stretching |

-continued

| Property | Method |
|---|---|
|  | rolls. 1 mm thick extruded bands of 10 ± 2 mm wide and 100 mm long were used for unstretched bands; the stretched bands were 0.7 ± 0.1 mm thick, 10 ± 2 mm wide and 100 mm long |
| Tensile Strength at Break and Elongation at Break | (1) ASTM D638 on 1 mm thick specimen type IV, obtained from sheets extruded on a Brabender 30 mm, 25 L/D" single screw extruder with 1 mm thick flat die, and cut in machine direction; (2) ASTM D882 on bands extruded on a 19 mm, 21 L/D" Plasticiser extruder, with temperature controlled stretching rolls. The unstretched bands were 10 ± 2 mm wide, 100 mm long and approximately 1 mm thick, while the stretched bands were 10 ± 2 mm wide, 100 mm long and 0.7 ± 0.1 mm thick, with 50 mm span. |
| Tensile Hysteresis Curve: | using a dynamometer on 0.7 ± 0.1 mm extruded-stretched bands, 10 ± 2 mm wide and 100 mm long, produced with 50 mm initial span, imposed elongation 100% and elongation speed 500 mm/min. |

Determination of Solubility in Xylene at room temperature (% by weight): 2.5 g of polymer were dissolved in 250 ml of xylene, at 135° C., under agitation. After 20 minutes, the solution was cooled to 25° C. under stirring, and then it was allowed to settle for 30 minutes. The precipitate was filtered with filter paper; the solution was evaporated under a nitrogen current, and the residue dried under vacuum at 80° C. until reached constant weight. The weight percentage of polymer soluble in xylene at room temperature was then calculated. The percent by weight of polymer insoluble in xylene at room temperature was considered the isotactic index of the polymer. This value corresponded substantially to the isotactic index determined by extraction with boiling n-heptane, which by definition constitutes the isotactic index of polypropylene.

Products Used in Working Examples

HPO-1: Heterophasic polyolefin composition comprising 15% wt. of a crystalline copolymer of propylene with 3.3% wt. ethylene, and 85% wt. of elastomeric fraction of propylene with ethylene, as prepared in Example 3 of the International Application no. WO03/011962.

HPO-2: Heterophasic polyolefin composition having MFR (230° C., 2.16 kg) of 0.6 g/10 min, obtained by slight visbraking HPO-1 via peroxide treatment during pelletization.

Hifax CA10A: Heterophasic polyolefin composition commercialized by Basell Polyolefins, comprising 31% wt. of a crystalline copolymer of propylene with 3.3% wt. ethylene, and 69% wt. of an elastomeric fraction of propylene with ethylene.

Mg(OH)$_2$(1): Hydrofy GS1.5 by Nuova Sima, natural magnesium hydroxide (brucite) having average particle size of 3.3 μm and broad particle size distribution.

Mg(OH)$_2$(2): Synthetic magnesium hydroxide having average particle size of 0.7 μm.

CaCO$_3$: Calcium carbonate having average particle size of 2.7 μm and narrow particle size distribution.

Processing Aid: low molecular weight internal polyolefin PIO 8, supplied by Condea.

Stabilizer: Irganox B225 commercialized by Ciba.

Examples 1 and 2

Highly filled polyolefin compositions according to the present invention were obtained by blending in a BUSS 70 co-kneader the heterophasic polyolefin composition and the mineral filler reported in Table 1. The mechanical properties of these compositions are reported in Table 1.

Comparative Example 1

A polyolefin composition similar to the one prepared in Examples 1–2 was obtained, with the exception that the heterophasic polymer composition was Hifax CA10A. The mechanical and elastic properties of this composition are reported in Table 1.

Comparative Examples 2–4

Pure heterophasic polyolefin compositions were tested for comparative purposes, without the addition of mineral filler. The mechanical and elastic properties of these compositions are reported in Table 1.

TABLE 1

| Components (% wt.) | Ex. 1 | Ex. 2 | Comp. Ex. 1 | Comp. Ex. 2 | Comp. Ex. 3 | Comp. Ex. 4 |
|---|---|---|---|---|---|---|
| HPO-1 | 29.1 | — | — | 100 | — | — |
| HPO-2 | — | 29.1 | — | — | 100 | — |
| Hifax CA10A | — | — | 29.1 | — | — | 100 |
| Mg(OH)$_2$ (1) | 67.0 | 67.0 | 67.0 | — | — | — |
| Processing aid | 3.4 | 3.4 | 3.4 | — | — | — |
| Stabilizer | 0.5 | 0.5 | 0.5 | — | — | — |
| Properties | | | | | | |
| MFR (230° C./2.16 kg) | — | — | — | 0.1 | 0.6 | 0.6 |
| MFR (230° C./21.6 kg) | 21.8 | 88.0 | 159.0 | | | |
| Elongation at break (%) (1) | 479 | 646 | 223 | 720 | 775 | 775 |
| Tensile strength at break (1) (MPa) | 5.0 | 4.0 | 4.7 | 14.0 | 11.5 | 20.5 |
| Hardness Shore A | 80.0 | 79.0 | 91.0 | 72.0 | 75.5 | >90.0 |

By comparing the obtained data with the ones obtained in Examples 1–2 and in Comp. Ex. 1, it is evident that, while all the filled compositions retain relatively low values of elongation at break, the compositions according to the present invention (Examples 1 and 2) show values of stress at break significantly higher than the one of the filled composition of the prior art (Comparative Example 1).

In fact, while all the highly filled compositions show similarly low stress at break (4.7 MPa Hifax CA10A, 5.0

MPa HPO-1; 4.0 MPa HPO-2), elongation at break is maintained surprisingly high for both HPO-1 and HPO-2 (479% and 646% respectively), while elongation at break is evidently deteriorated for Hifax CA10A (223%).

Therefore, the compositions of the invention show high ductility properties, due to the fact that the high amount of filler does not deteriorate the elastic properties of the heterophasic polyolefin composition.

Examples 3–5

Highly filled polyolefin compositions according to the present invention were obtained by blending in a BUSS 70 co-kneader the heterophasic polyolefin composition, different kinds of mineral filler and the other components reported in Table 2.

The mechanical and elastic properties of these compositions, both measured on unstretched and stretched bands (produced on a 19 mm, 21 L/D" Plasticiser extruder with temperature controlled stretching rolls, with a stretching ratio of 3:1), are reported in Table 2.

Comparative Example 5

A polyolefin composition similar to the one prepared in Example 3 was obtained, with the exception that the heterophasic polymer composition was Hifax CA10A. The mechanical and elastic properties of the composition, both measured on unstretched and stretched bands (produced on a 19 mm, 21 L/D" Plasticiser extruder with temperature controlled stretching rolls, with a stretching ratio of 3:1), are reported in Table 2.

This behaviour was confirmed by measuring the hysteresis curves, reported in FIG. 1: the dissipated energy (which is the area between the loading and the unloading curve) is much higher in the curve of the filled compositions of the prior art (Comparative Example 5) compared to the one corresponding to Example 3 (87% vs 71% respectively).

Furthermore the residual elongation (unloading curve at zero load) of the composition of Comparative Example 5 is greater than the one corresponding to Example 3 (35% vs 20%). These numbers corroborate the elastic behaviour observed after cold stretching in the bands of highly filled polyolefin compositions according to the instant invention.

The invention claimed is:

1. A polyolefin composition comprising, by weight:
   (I) 30 to 50% by weight of an heterophasic polyolefin composition comprising the following fractions:
   A) from 8 to 25% by weight of a crystalline polymer fraction selected from:
      (i) a propylene homopolymer, having solubility in xylene at room temperature lower than 10% by weight;
      (ii) a copolymer of propylene and at least one alpha-olefin of formula $H_2C=CHR$, where R is H or a $C_{2-10}$ linear or branched alkyl, containing at least 85% by weight of propylene, having solubility in xylene at room temperature lower than 15% by weight; and
      (iii) a mixture of (i) and (ii);
   B) from 75 to 92% by weight of an elastomeric fraction comprising:
      (1) a first elastomeric copolymer of propylene with at least one alpha-olefin of formula $H_2C=CHR$, where R

TABLE 2

| Components (% wt.) | Example 3 | Example 4 | Example 5 | Comp. Example 5 |
| --- | --- | --- | --- | --- |
| HPO-1 | 29.1 | 29.1 | 29.1 | — |
| Hifax CA10A | — | — | — | 29.1 |
| Mg(OH)$_2$ (1) | 67.1 | — | — | 67.0 |
| Mg(OH)$_2$ (2) | — | 67.0 | — | — |
| C$_a$CO$_3$ | — | — | 67.0 | — |
| Processing aid | 3.4 | 3.4 | 3.4 | 3.4 |
| Stabilizer | 0.5 | 0.5 | 0.5 | 0.5 |
| Properties |
| MFR (230° C./21.6 kg) | 21.8 | 29.0 | 16.4 | 159.0 |

| | Unstretched | 3:1 stretched | Unstretched | 3:1 stretched | Unstretched | 3:1 stretched | Unstretched | 3:1 stretched |
| --- | --- | --- | --- | --- | --- | --- | --- | --- |
| Elongation at break (2) (%) | 760 | 440 | 590 | 400 | 670 | 480 | 280 | 230 |
| Tensile strength at break (2) (MPa) | 5.3 | 8.0 | 3.3 | 5.0 | 3.9 | 5.0 | 3.1 | 5.3 |
| Tension set (100%) | 32 | 15 | 22 | 9 | 27 | 11 | 53 | 33 |

The above results demonstrate that the presence of high amounts of filler in the polyolefin compositions of the present invention do not deteriorate the elastic properties, differently from the compositions known in the state of the art. Indeed, the tension set data of the highly filled soft polyolefin compositions of the invention (Example 3) both non-stretched and stretched (32% and 15% respectively) is almost the half of those of the highly filled composition of Comparative Example 5 (53% and 33% respectively).

Moreover, it was observed that, after cold stretching, the highly filled polyolefin compositions of the invention behave like an elastic band.

is H or a $C_{2-10}$ linear or branched alkyl, optionally containing 0.5 to 5% by weight of a diene, said first elastomeric copolymer containing from 15 to 32% by weight alpha-olefin, and having solubility in xylene at room temperature greater than 50% by weight, the intrinsic viscosity of the xylene soluble fraction ranging from 3.0 to 5.0 dl/g; and (2) a second elastomeric copolymer of propylene with at least one alpha-olefin of formula $H_2C=CHR$, where R is H or a $C_{2-10}$ linear or branched alkyl, optionally containing 0.5 to 5% by weight of a diene, said second elastomeric copolymer containing more than 32% up to 45% by weight alpha-olefin, and having solubility in xylene at room temperature greater than 80% by weight, the intrinsic viscosity of the xylene soluble fraction ranging from 4.0 to 6.5 dl/g;

the (1)/(2) weight ratio ranging from 1:5 to 5:1 and the intrinsic viscosity of the xylene soluble fraction ranging from 3.0 to 6.5 dl/g; and (II) 50–70% by weight of an inorganic filler selected from flame-retardant inorganic fillers and inorganic oxides or salts.

2. The polyolefin composition according to claim 1, wherein in the heterophasic polyolefin composition (I), said alpha-olefin of formula $H_2C=CHR$ is preferably selected from ethylene, butene-1, pentene-1, 4-methylpentene, hexene-1, octene-1 and combinations thereof.

3. The polyolefin composition according to claim 1 wherein, in the elastomeric fraction (B), said first elastomeric copolymer (1) of propylene contains from 20 to 30% by weight alpha-olefin, has solubility in xylene at room temperature greater than 70% by weight, the intrinsic viscosity of the xylene soluble fraction ranging from 3.5 to 4.5 dl/g; and said second elastomeric copolymer (2) of propylene contains from 35 to 40% by weight of alpha-olefin, and has solubility in xylene at room temperature greater than 85% by weight, the intrinsic viscosity of the xylene soluble fraction ranging from 4.5 to 6.0 dl/g; the (1)/(2) weight ratio ranging from 1:2 to 4:1.

4. The polyolefin composition according to claim 1, wherein the heterophasic composition (I) is obtained by sequential polymerization in at least two stages, carried out in the presence of a catalyst comprising a trialkylaluminum compound, optionally an electron donor, and a solid catalyst component comprising a halide or halogen-alcoholate of Ti and an electron-donor compound supported on anhydrous magnesium chloride.

5. The polyolefin composition according to claim 2 wherein said solid catalyst component has a surface area (measured by BET) of less than 200 m$^2$/g, and a porosity (measured by BET) higher than 0.2 ml/g.

6. The polyolefin composition according to claim 1, wherein the inorganic filler (II) is a flame-retardant inorganic filler selected from hydroxides, hydrated oxides, salts and hydrated salts of metals.

7. The polyolefin composition according to claim 1, wherein the flame-retardant inorganic filler is selected from $Mg(OH)_2$, $Al(OH)_3$, $Al_2O_3 \cdot 3H_2O$, magnesium carbonate hydrate, $MgCO_3$, magnesium calcium carbonate hydrate, magnesium calcium carbonate, and mixtures thereof.

8. The polyolefin composition according to claim 1, wherein the inorganic filler (II) is an inorganic oxide or salt selected from CaO, $TiO_2$, $Sb_2O_3$, ZnO, $Fe_2O_3$, $CaCO_3$, $BaSO_4$ and mixtures thereof.

9. The polyolefin composition according to claim 1, having Shore A hardness lower than 90, elongation at break higher than 400%, tensile strength at break equal to or higher than 4 MPa and tension set at 100% lower than 35%.

10. The polyolefin composition according to claim 9, having Shore A hardness lower than 85, elongation at break higher than 450%, tensile strength at break higher than 5MPa and tension set at 100% lower than 30%.

11. An article comprising a polyolefin composition comprising, by weight:

(I) 30 to 50% by weight of an heterophasic polyolefin composition comprising the following fractions:

A) from 8 to 25% by weight of a crystalline polymer fraction selected from:
  (i) a propylene homopolymer, having solubility in xylene at room temperature lower than 10% by weight;
  (ii) a copolymer of propylene and at least one alpha-olefin of formula $H_2C=CHR$, where R is H or a $C_{2-10}$ linear or branched alkyl, containing at least 85% by weight of propylene, having solubility in xylene at room temperature lower than 15% by weight; and
  (iii) a mixture of (i) and (ii):

B) from 75 to 92% by weight of an elastomeric fraction comprising;

(1) a first elastomeric copolymer of propylene with at least one alpha-olefin of formula $H_2C=CHR$, where R is H or a $C_{2-10}$ linear or branched alkyl, optionally containing 0.5 to 5% by weight of a diene, said first elastomeric copolymer containing from 15 to 32% by weight alpha-olefin, and having solubility in xylene at room temperature greater than 50% by weight, the intrinsic viscosity of the xylene soluble fraction ranging from 3.0 to 5.0 dl/g; and (2) a second elastomeric copolymer of propylene with at least one alpha-olefin of formula $H_2C=CHR$, where R is H or a $C_{2-10}$ linear or branched alkyl, optionally containing 0.5 to 5% by weight of a diene, said second elastomeric copolymer containing more than 32% up to 45% by weight alpha-olefin, and having solubility in xylene at room temperature greater than 80% by weight, the intrinsic viscosity of the xylene soluble fraction ranging from 4.0 to 6.5 dl/g;

the (1)/(2) weight ratio ranging from 1:5 to 5:1 and the intrinsic viscosity of the xylene soluble fraction ranging from 3.0 to 6.5 dl/g; and (II) 50 to 70% by weight of an inorganic filler selected from flame-retardant inorganic fillers and inorganic oxides or salts.

* * * * *